US010017089B2

(12) United States Patent
Wallace et al.

(10) Patent No.: US 10,017,089 B2
(45) Date of Patent: Jul. 10, 2018

(54) DEVICE FOR HOLDING AND SECURING ELECTRONIC CIGARETTES IN A MOTOR VEHICLE

(71) Applicants: Michael W Wallace, Albuiquerque, NM (US); Young Ward, Albuquerque, NM (US)

(72) Inventors: Michael W Wallace, Albuiquerque, NM (US); Young Ward, Albuquerque, NM (US)

( * ) Notice: Subject to any disclaimer, the term of this patent is extended or adjusted under 35 U.S.C. 154(b) by 17 days.

(21) Appl. No.: 15/097,902

(22) Filed: Apr. 13, 2016

(65) Prior Publication Data

US 2016/0297341 A1    Oct. 13, 2016

Related U.S. Application Data

(60) Provisional application No. 62/146,923, filed on Apr. 13, 2015.

(51) Int. Cl.
*B60N 3/12*  (2006.01)
*B60J 1/20*  (2006.01)
*A24F 21/00*  (2006.01)
*A24F 47/00*  (2006.01)

(52) U.S. Cl.
CPC ............... *B60N 3/12* (2013.01); *A24F 21/00* (2013.01); *A24F 47/002* (2013.01); *B60J 1/20* (2013.01)

(58) Field of Classification Search
CPC .... B65D 81/05–81/054; B65D 81/02–81/027; B65D 25/10–25/103; B65D 25/107; B65D 90/004; B65D 90/0046; B65D 90/0041; B65D 90/005; B60N 3/10; B60N 3/12; F16L 3/08–3/1066
USPC .................................. 428/36.9, 36.91, 36.92
See application file for complete search history.

(56) References Cited

U.S. PATENT DOCUMENTS

| | | | | |
|---|---|---|---|---|
| 1,586,637 A * | 6/1926 | Myers | ................. | B65D 5/504 |
| | | | | 206/482 |
| 3,229,946 A * | 1/1966 | Mackay | ................. | B60R 7/046 |
| | | | | 108/46 |
| 4,776,623 A * | 10/1988 | Manning | ............ | G11B 23/0236 |
| | | | | 206/387.15 |
| 4,884,400 A * | 12/1989 | Tanaka | ................. | F01N 13/102 |
| | | | | 60/323 |
| 5,072,909 A * | 12/1991 | Huang | ................. | B60N 3/102 |
| | | | | 248/215 |
| 5,573,214 A * | 11/1996 | Jones | ................. | B60N 3/103 |
| | | | | 248/205.5 |

(Continued)

*Primary Examiner* — Kevin R Kruer

(57) ABSTRACT

Device for holding and securing Electronic Cigarettes within a motor vehicle comprising a box-like structure having side panels, a rear panel, and a bottom panel, accessible from the top and the front. The device contains a plurality of upper and lower flexible constructs within the interior of the device acting as securing means to secure either cylindrical or box-type Electronic Cigarettes of varying dimensions. The device holds and secures, alternately, cylindrical or box-type Electronic Cigarettes, in the same space within the holder, as opposed to having separate compartments for each type of Electronic Cigarette. The invention also introduces a multi-bracket vehicle door panel mounting system where different size brackets are employed to conform to vehicle door panels of varying depths.

6 Claims, 8 Drawing Sheets

(56) References Cited

U.S. PATENT DOCUMENTS

| | | | | |
|---|---|---|---|---|
| 7,172,164 B2* | 2/2007 | Fuelling | ................ | A01K 97/10 |
| | | | | 248/309.1 |
| 8,550,550 B2* | 10/2013 | Cassese | ................ | A47G 19/06 |
| | | | | 220/23.8 |
| 8,794,434 B2* | 8/2014 | Scatterday | .............. | A24F 15/12 |
| | | | | 206/256 |
| D718,493 S * | 11/2014 | Stern | ............................ | D27/189 |
| 9,033,177 B2* | 5/2015 | Home | ....................... | B65F 1/06 |
| | | | | 220/495.08 |
| 2012/0160723 A1* | 6/2012 | Harms | ................. | A61M 5/003 |
| | | | | 206/438 |
| 2013/0306692 A1* | 11/2013 | Mangum | ................ | A24F 47/00 |
| | | | | 224/257 |

* cited by examiner

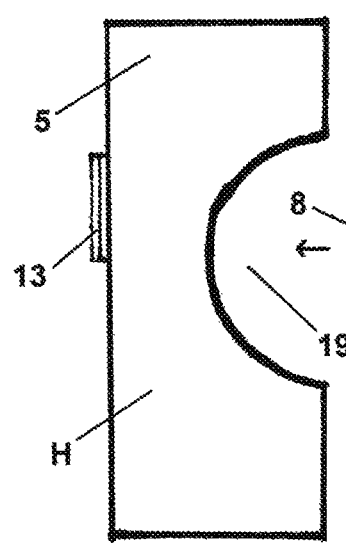
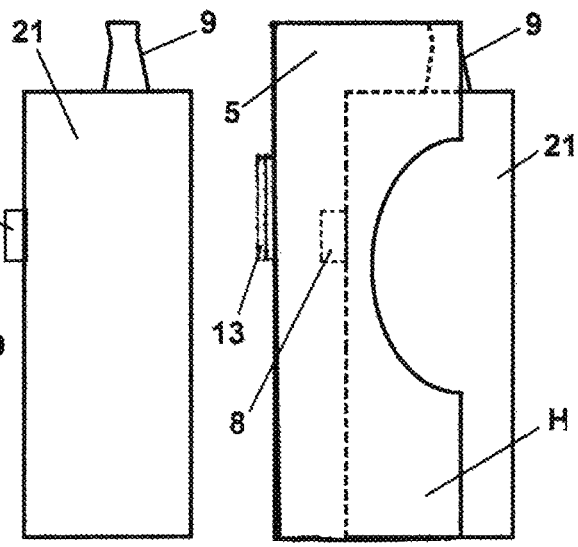
FIG. 5  FIG. 6
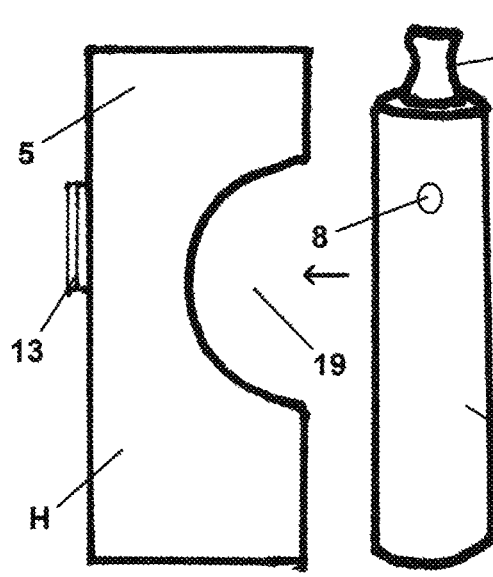
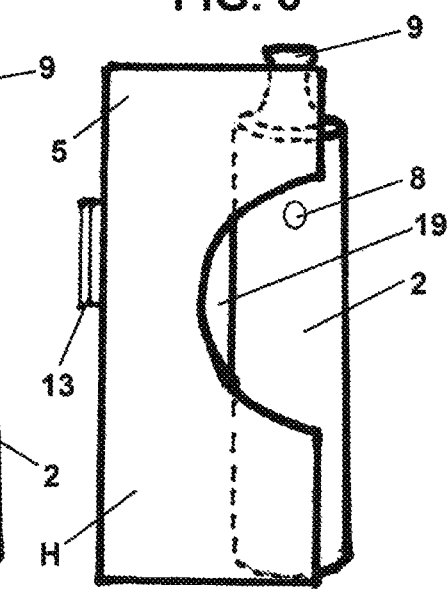
FIG. 7  FIG. 8

DEVICE FOR HOLDING AND SECURING ELECTRONIC CIGARETTES IN A MOTOR VEHICLE

BACKGROUND OF THE INVENTION

1. Field of the Invention

The invention relates to a device for holding and securing Electronic Cigarettes while in a motor vehicle. In particular, a device for holding and securing Electronic Cigarettes of varying configurations, dimensions and materials of manufacture. The device allows for easy insertion and removal of Electronic Cigarettes with minimal attention necessary from the user. The invention also incorporates a mounting system that provides a means of mounting the device on vehicle door panels of varying depths.

2. Background of the Invention

Over the past several years, the use and popularity of Electronic Cigarettes have experienced tremendous growth, whereas best estimates currently report millions of users and thousands of retail stores in the United States devoted exclusively to the sale of Electronic Cigarettes and associated accessories.

Originally marketed as a smoking cessation aid, Electronic Cigarettes have now come to be used both socially and recreationally as well. This phenomenon is evidenced by the multitude of smoking lounges that cater to "vaping" (the term that refers to the act of puffing on an Electronic Cigarette and exhaling the residual) popping up in municipalities across the country. It is not uncommon for these outlets to hold "vaping" competitions where the contestants are judged on the volume of the vapor cloud they can produce from their Electronic Cigarette and the distance they can project the cloud away from themselves.

An Electronic Cigarette is a portable device independently powered by a battery (or batteries) contained within the body of the Electronic Cigarette. The battery is used to energize an atomizer that vaporizes a liquid solution referred to as "e-juice" held in a reservoir within the body of the Electronic Cigarette. Once the "e-juice" is vaporized, the user ingests the vapor by inhaling it through a mouthpiece. The process of repeatedly vaporizing the "e-juice" necessarily requires regular refilling of the "e-juice" reservoir whereas the duration between refills is determined primarily by the frequency of use and the volume of the "e-juice" reservoir within the particular Electronic Cigarette.

Electronic Cigarettes are only "cigarettes" in that many are shaped like a cigarette, puffed like a cigarette, produce a cloud similar to cigarette smoke upon exhalation, and depending on the preference of the individual user, may contain nicotine to be ingested upon inhalation of the vapor. Primary characteristics and modalities differentiating Electronic Cigarettes from regular cigarettes are that they leave no burned residual, contain no tobacco, and require no fire to be "lit". Electronic Cigarettes do share commonalities with traditional cigarettes when it comes to the environments in which they are used. So much, in fact, that the places where each are used and the activities associated with the usage of each are essentially the same. Each are commonly used in social settings, while one is alone, in bars and restaurants, at home, and in one's vehicle.

The present invention relates to the usage of Electronic Cigarettes in a motor vehicle.

The use of regular cigarettes, and more specifically, their use in a motor vehicle, can be used to illustrate and understand the purpose and utility of the invention.

Up until about twenty years ago, new passenger cars and trucks were routinely equipped with ash trays for cigarettes. These ash trays primarily served two purposes: 1) as a receptacle for burned ashes, and 2) as a place to rest the cigarette when not being smoked. While Electronic Cigarettes certainly have no need for a burned ash receptacle, they do need a place to rest when not being "smoked". Motorists, whether driver or passenger, that use an Electronic Cigarette commonly find themselves looking for a place to rest their Electronic Cigarette. With no built-in provision for holding Electronic Cigarettes in the vehicle, the Electronic Cigarettes get lost in and around the upholstery and fixtures, roll around on the floorboard, get in the way of the control pedals, have parts of them broken off, and often, because of the abnormal physical orientation of the Electronic Cigarette, will leak the "e-juice" into and onto the interior of the vehicle.

This is the purpose and utility of the invention: to provide a place to rest and secure an Electronic Cigarette within a motor vehicle.

Notwithstanding a few exceptions for some novelty designs, Electronic Cigarettes are manufactured primarily in two configurations: 1) cylindrical and 2) box-type. For purposes of clarity and understanding of the invention, the following definitions will be used within the specification for the two configurations. Cylindrical will be understood to mean all Electronic Cigarettes of a cylindrical shape, regardless of length or diameter, and box-type will be understood to mean all Electronic Cigarettes that are not cylindrical; with the vast majority of those being in the shape of a square or rectangle. For specification purposes, references herein to these two configurations relate solely to the physical shapes of the devices and do not relate to their operation.

Both cylindrical and box-type Electronic Cigarettes are manufactured in varying dimensions and both have activation buttons located generally near the top of the Electronic Cigarette. The activation button for a rectangular box-type is most commonly found on the narrow vertical edge of the Electronic Cigarette. Cylindrical and box-type Electronic Cigarettes both have a mouthpiece extending from the top of either the cylinder or the box.

The present invention provides a device for holding and securing Electronic Cigarettes of varying types, sizes, and dimensions within a motor vehicle combined with ease of use. This relates briefly to how the present invention intends to assuage some of the problems adverted to above. Advantages of the invention will be appreciated in greater detail from the following descriptions.

REFERENCES AND DESCRIPTION OF THE PRIOR ART

Several patents have been granted with respect to holders of different items within a motor vehicle, with several of those providing for vehicle door bracket mounting. Others exist as portable holders or cases for Electronic Cigarettes. The most pertinent of these follow.

U.S. PATENT DOCUMENTS

| | | | |
|---|---|---|---|
| 3,229,946 | January 1966 | Kenneth Mackay | SERVICE RECEPTACLE |
| 4,776,623 | October 1988 | Manning | APPARATUS FOR STORING AND TRANSPORTING CASSETTES |
| 4,884,400 | July 1989 | Jasmagy Jr. | DRINK CONTAINER HOLDER |
| 5,072,909 | December 1991 | Huang | ADJUSTABLE CUP HOLDER IN THE CAR |
| 5,573,214 | November 1996 | Jones et al. | CUPHOLDER FOR USE IN VEHICLES |
| 8,550,550 | October 2013 | Cassese et al. | SEAT ARM CUP HOLDER FOR SNACK FOODS |
| 2013/0306692 | November 2013 | Mangum et al. | SYSTEM AND METHOD FOR HOLDING A SMOKELESS CIGARETTE |
| 8,794,434 | August 2014 | Scatterday et al. | ELECTRONIC CIGARETTE CONTAINER |
| D718,493S | November 2014 | Stern | ELECTRONIC CIGARETTE HOLDER |

Whereas Electronic Cigarettes and "vaping" are so relatively new, patent history for these devices and related items are limited. Most of the citations listed here are related to how holders or carriers of various items are mounted or secured within a motor vehicle.

U.S. Pat. No. 4,776,623 issued Oct. 11, 1988 is the most relevant of these, describing a multiple cassette holder that can be portably carried with an attached handle or mounted in a vehicle by means of a door bracket. This door bracket or brackets, designed to suspend the cassette holder against the interior door panel, are similar to the brackets of the current invention whereas they are both in the shape of an inverted "J" having a first vertical member extending downward into the space between the vehicle window glass and the window molding, a horizontal member extending inward the vehicle from the glass, attached to the top of the first vertical member, and a second vertical member attached to the inward edge of the horizontal member and extending downward along the interior door panel. Both door brackets are designed with means to couple them to their respective holders.

The critical limitation of the bracket system described in U.S. Pat. No. 4,776,723 is the lack of any provision for the various depths of vehicle door panels. (The "depth" of a vehicle door panel within this specification shall be understood to mean the distance between the interior window glass molding and the face of the interior door panel.) Attempting to place this bracket on a vehicle door panel where the depth of the door panel exceeds the length of the horizontal member of the bracket, (the bracket is too small) not allowing the bracket to physically fit over the door panel, effectively renders it useless. Multiple issues also arise when the length of the horizontal member of the bracket exceeds the depth of the vehicle door panel (the bracket is too big). The bracket will be loose on the door panel, and the holder attached to the bracket will become positioned at an acute angle relative to the length and position of the horizontal member of the bracket creating stability problems for both the holder and whatever it may be holding.

U.S. Pat. No. 4,844,400, issued Jul. 4, 1989 describes a two part drink container holder purporting to incorporate a vehicle door bracket hanger constructed of a "substantially rigid pliable type material" and "a distal end configured for insertion of a portion thereof between said window and said window channel". This bracket is apparently designed with a bendable horizontal member to conform to differing depths of door panels. While this certainly qualifies as an attempt to deal with the issue of varying vehicle door panel depths, it remains unclear as to how this "rigid pliable type material" is preformed at its "distal end" with a 90 degree angle so as to extend down into the channel between the window glass and its molding; when it appears from the description and drawings that the bendable hanger and its "distal end" are manufactured as a single piece of the same material. It is also unclear as to how this "rigid pliable type material" would perform in extreme temperatures, either hot or cold.

The present invention provides a simple and novel solution to the problem of varying vehicle door panel depths. Multiple interchangeably detachable brackets with the horizontal member of each bracket being manufactured in varying lengths, are provided with the Electronic Cigarette holder whereas the user simply chooses the bracket that best fits their vehicle door panel and attaches the holder to that bracket. Additionally, this solution allows the user to move the holder from vehicle to vehicle irrespective of whether the other vehicle has the same door panel depth as the original vehicle. The user only needs to transfer the holder and bracket currently in use to the other vehicle or choose another bracket more suited to that vehicle's door panel and attach the holder to the new bracket.

INTERNET REFERENCES AND DESCRIPTION

The Internet references provided below most accurately reflect the current state of the art in Electronic Cigarette holders for motor vehicles.
1) Waxysvapeshop.com/collections/modblock-piston-series
2) www.youtube.com/watch?v=NBOVdGCdoNc
3) www.youtube.com/watch?v=cfqM4EGdzOEseries Most Electronic Cigarette holders designed for use in a motor vehicle today are in very limited production and supply. Many are marketed on the internet by individuals on their own sites or on cooperative marketing sites. Very few of the devices are mass produced and most of them are homemade or individually manufactured. The common limitation shared by all of these devices is a lack of versatility. Each of these devices are restricted to holding a single type and/or dimension of Electronic Cigarette. The present invention introduces a device capable of holding and securing multiple types and sizes of Electronic Cigarettes while delivering improvements in design, convenience, versatility, utility, and marketability when compared to other Electronic Cigarette holders currently on the market.

Internet reference #1 is a website that markets and sells (among other products) Electronic Cigarette holders for a motor vehicle. These holders appear to be individually made and are designed to fit into existing cupholders in most passenger cars and trucks sold today. The most obvious drawback to any Electronic Cigarette holder designed to fit into the cupholder is that it eliminates the use of the use of that cupholder for holding a cup. Characteristics of this type of holder include the necessity of a cavity within the holder to be compatible with the dimensions of an individual user's Electronic Cigarette. The cavity within the holder must be able to accept a particular Electronic Cigarette, not be so loose that the Electronic Cigarette moves around or falls out, and not be so tight that the particular Electronic Cigarette will not fit into the cavity. The extensive range of sizes and dimensions of Electronic Cigarettes on the market today require this type of holder to be almost exclusively custom-made and/or ordered.

Internet reference #2 is a Youtube video of an Electronic Cigarette holder system for a motor vehicle consisting of a magnet attached to a cylindrical Electronic Cigarette and a second magnet attached to the dashboard of a vehicle. Both magnets appear to be attached at their respective locations with an adhesive. The magnet attached to the Electronic Cigarette and the magnet attached to the dashboard of the vehicle are then aligned and mated, thus suspending the Electronic Cigarette on the face of the dashboard. This design necessarily requires a different magnet for every diameter of cylindrical Electronic Cigarette. The ability of the dashboard magnet to effectively adhere to different dashboards, and the strength of the magnetic union and its ability to secure an Electronic Cigarette to the dashboard during normal or adverse driving conditions are unclear. Also, the willingness of the motoring public to glue anything to the dashboard of their vehicle is unknown.

Internet reference #3 is a Youtube video of an Electronic Cigarette holder fro a motor vehicle consisting of a "U" shaped bracket with the bottom of the "U" oriented vertically and the remaining two appendages oriented horizontally. The upper appendage has a hole at its outer end and the lower appendage is solid. The hole in the upper appendage is designed as a receiver for a cylindrical Electronic Cigarette and the lower appendage serves as a base or "stop" for the cylindrical Electronic Cigarette. This is the most common design of an Electronic Cigarette holder for a motor vehicle being marketed today, with several iterations available on the internet. This type of holder can be mounted in various manners with the most common method having the bottom of the "U" secured to the face of the dashboard or clasped to an air vent in the dashboard. Once the holder is secured, the Electronic Cigarette is inserted into the holder through the through the hole in the upper appendage and comes to rest on the lower appendage. Obvious limitations of this design include holding only cylindrical Electronic Cigarettes, the inability to hold and/or secure varying diameters of cylindrical Electronic Cigarettes without a separate holder or modification of the original holder, and the willingness of the motoring public to mount this holder to their dashboard. This type of holder also requires a certain degree of attention from the user to accurately insert the Electronic Cigarette.

SUMMARY OF THE INVENTION

1. Objects of the Invention

It is an object of the present invention to provide a device to easily and conveniently rest and secure an Electronic Cigarette within a motor vehicle.

It is a second object of the invention to provide a device that will hold and secure cylindrical or box-type Electronic Cigarettes.

Another object of the invention is to provide a versatile device of minimal dimensions facilitated by a design that allows, alternately, a cylindrical or box-type Electronic Cigarette to occupy the same spatial confines within the device.

It is a further object of the invention to provide a device that will hold and secure cylindrical Electronic Cigarettes of varying lengths and diameters.

Another object of the invention is to provide a device that will hold and secure box-type Electronic Cigarettes of varying dimensions to include height, width, and depth.

A further object of the invention is to provide a convenient, portable, easily accessible, adaptable, non-permanent or surface marring, vehicle mounting system for the device.

Another object of the invention is to provide a device that allows for ease of insertion and removal of an Electronic Cigarette with minimal distraction for the user.

2. Summary of the Invention

The present invention introduces a novel and improved method of holding and securing an Electronic Cigarette within a motor vehicle. Specifically, the invention provides a device comprising a semi-enclosure accessible from the front and the top, means to secure Electronic Cigarettes of different types and sizes within the device and a simple, versatile mounting system for the device.

In more detail, the semi-enclosure is comprised of two parallel side panels, a back panel, and a bottom panel. These panels constitute the frame of the device. The interior of the device is populated by a plurality of various flexible constructs projecting inward from the panels of the device. The interior flexible constructs are manufactured of a thermoplastic elastomer (a plastic with the properties of rubber) allowing them to become displaced to securely engage an Electronic Cigarette upon insertion into the device. Cut out from each of the parallel side panels in a generally semi-circular pattern is an opening providing for easy insertion and removal of an Electronic Cigarette into and out of the device.

In the preferred embodiment, the frame and interior flexible constructs of the device are manufactured of the same thermoplastic elastomer, resulting in a device constructed of a single material. Having the entire device manufactured of the same material allows the flexible exterior panels to work in combination with the internal flexible constructs to secure an Electronic Cigarette. Once an Electronic Cigarette is inserted into the device, it contacts and engages the internal flexible constructs, causing them to be displaced, while simultaneously causing the side panels to also be displaced, deflecting outwardly. The resulting degree of displacement of the engaged flexible constructs and deflection of the side panels becomes a function of the type and physical dimensions of the particular Electronic Cigarette inserted into the device.

The design and placement of the interior flexible constructs allow Electronic Cigarettes of different types and dimensions to be secured within the device.

All cylindrical Electronic Cigarettes are secured by the flexible constructs located within the upper interior of the device. These upper constructs are a plurality of projections positioned in a "V" pattern. This "V" pattern is oriented horizontally near the top of the device, with the opening of the "V" positioned at the front of the device and terminating at the rear panel. These projections are sufficiently flexible to allow ease of insertion and removal of the Electronic Cigarette while remaining sufficiently rigid to adequately secure the Electronic Cigarette within the device. The pattern of projections allow a cylindrical Electronic Cigarette to be inserted and simply pushed into the device until it reaches a point where it is secure. This design results in larger diameter cylindrical Electronic Cigarettes being secured near the front of the device and narrow diameter cylindrical Electronic Cigarettes being secured at the rear of the device.

The length of a cylindrical Electronic Cigarette capable of being secured within the device is relatively unlimited whereas the top of the cylindrical Electronic Cigarette extends above the top of the device. A cylindrical Electronic Cigarette can be engaged and secured by the flexible constructs at the top and bottom interior of the device simultaneously, provided the cylindrical Electronic Cigarette is of a sufficient diameter to physically engage the bottom flexible constructs.

To accurately describe the method of securing box-type Electronic Cigarettes within the device, we must separate the box-type Electronic Cigarette into two parts: 1) the body and 2) the mouthpiece. All box-type Electronic Cigarettes are secured by the flexible constructs projecting inwardly within the lower interior of the device. The box-type Electronic Cigarette is inserted into the holder with the narrow edge of the body being the leading edge. Upon insertion, the lower flexible constructs of the device are engaged and displaced by the body of the box-type Electronic Cigarette, effectively securing it within the device. Insertion of wider box-type Electronic Cigarettes will necessarily result in a more exaggerated displacement of the interior flexible constructs than narrow-bodied models. The box-type Electronic Cigarette, as well as the cylindrical type, need only be pushed into the device to a depth sufficient to adequately secure the particular Electronic Cigarette.

The mouthpieces of box-type Electronic Cigarettes are located, almost without exception, at the top of the body of the Electronic Cigarette. The mouthpiece can be positioned anywhere along the top of the body of the Electronic Cigarette. However, the vast majority of mouthpieces are located at either end, or the center, of the top of the body.

The mouthpiece of a particular box-type Electronic Cigarette may or may not engage the upper interior flexible constructs of the device. Whether the mouthpiece of a box-type Electronic Cigarette will or will not engage the upper flexible constructs depends on several factors.

The mouthpiece of a box-type Electronic Cigarette can engage the upper flexible constructs within the device if:
1. The mouthpiece extends sufficiently vertical within the device to engage the upper constructs.
2. The diameter of the mouthpiece is wide enough to engage the upper constructs.
3. The box-type Electronic Cigarette is inserted deep enough into the device to allow the mouthpiece to engage the upper constructs.

The mouthpiece of a box-type Electronic Cigarette cannot engage the upper flexible constructs of the device if:
1. The mouthpiece does not extend sufficiently vertical to engage the upper constructs.
2. The diameter of the mouthpiece is not wide enough to engage the upper constructs.
3. The box-type Electronic Cigarette is not inserted deep enough into the device to allow the mouthpiece to engage the upper constructs.

For example: When a box-type Electronic Cigarette is inserted into the device with the mouthpiece positioned at the top near the leading edge of the body, the mouthpiece is much more likely to engage the upper constructs than if the box-type Electronic Cigarette is rotated 180 degrees and inserted with the mouthpiece positioned opposite the leading edge. Thus, it follows, that if all box-type Electronic Cigarette bodies are engaged and secured by the lower flexible constructs within the device, and their mouthpieces can (depending on previously described factors) also be engaged by the upper flexible constructs within the device, that a box-type Electronic Cigarette can be secured within the device by both its body and mouthpiece simultaneously. But whereas securing a box-type Electronic Cigarette by both its body and mouthpiece may not result in its most effective positioning within the device, the orientation of the box-type Electronic Cigarette upon insertion into the device is left to the discretion of the user.

Included on the back of the device are coupling means designed to couple the device to a bracket.

Multiple brackets are provided with the device in order to create a simple and versatile vehicle mounting system for the device. The brackets are designed in the shape on an inverted "J", having a first vertical member to extend downward into the channel between the window glass and the window molding, a horizontal member attached to the top of the first vertical member extending inward the vehicle, and a second vertical member attached to the end of the horizontal member and extending downward along the face of the door panel. Each of the door brackets include duplicate coupling means located on the outside of the second vertical member of the bracket to removably couple the device to each bracket. The provided brackets are manufactured of a semi-rigid plastic and are identical with the only exception being that the horizontal member of each bracket is a different length. This provides a quick and easy solution to the problem of mounting the device on door panels of varying depths. The user simply chooses the bracket that best conforms to the door panel of their vehicle and couples the device to it. A single bracket can be moved from vehicle to vehicle provided that both vehicles have the same depth of door panel. The user can also take the device from vehicle to vehicle even when the vehicles have door panels of different depths. The user simply uncouples the device from the bracket in the first vehicle and couples it to an alternate bracket best suited to the door panel of the second vehicle.

While the preceding descriptions lay out the salient characteristics of the present invention, it should be understood that it may be practiced otherwise than as specified herein. For example: The internal flexible constructs within the device could incorporate some sort of spring-loaded mechanism or a metal that exhibits flexible characteristics to perform the securing function of the device. It should also be understood that the specific embodiments disclosed herein may be used for designing or modifying other devices that mimic the described intentions of the present invention.

BRIEF DESCRIPTION OF THE DRAWINGS

FIG. 5 is a left side view of the holder and a large box-type Electronic Cigarette and their positions relative to each other prior to insertion;

FIG. 6 is a left side view of the holder with a large box-type Electronic Cigarette within the holder with phantom lines indicating the position of the Electronic Cigarette within the holder;

FIG. 7 is a left side view of the holder and a large diameter cylindrical Electronic Cigarette and their positions relative to each other prior to insertion;

FIG. 8 is a left side view of the holder with a large diameter cylindrical Electronic Cigarette with phantom lines indicating the position of the Electronic Cigarette within the holder;

DESCRIPTION OF THE PREFERRED EMBODIMENT

Figure 23:
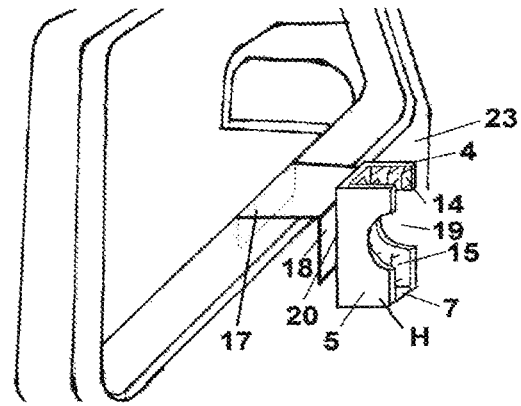
FIG. 23 is a perspective illustration of the Electronic Cigarette holder coupled to the bracket including the interior vehicle door panel to which it is mounted.

Referring to the drawings, FIG. 23 shows the preferred general structure of a device (designated H for "holder") for holding and securing Electronic Cigarettes within a motor vehicle and its general bracket mounting position.

Figures 3, 4:
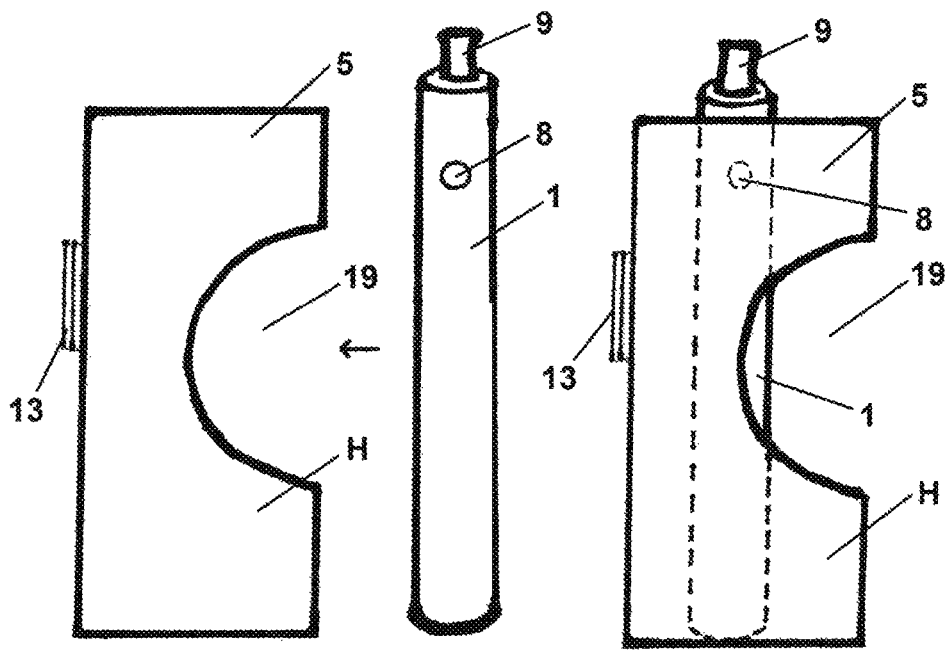
FIG. 3 is a left side view of the holder and a small diameter cylindrical Electronic Cigarette and their positions relative to each other prior to insertion.
FIG. 4 is a left side view of the holder with a small diameter cylindrical Electronic Cigarette with phantom lines indicating the position of the Electronic Cigarette within the holder.
Figure 9:
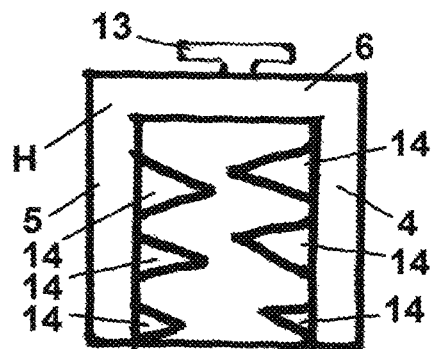
FIG. 9 is a top view of the empty holder.
Figure 10:
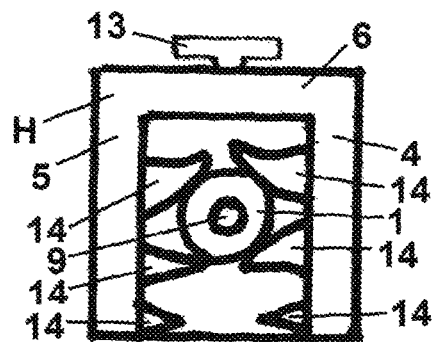
FIG. 10 is a top view of the holder containing a cylindrical Electronic Cigarette.
Figure 11:
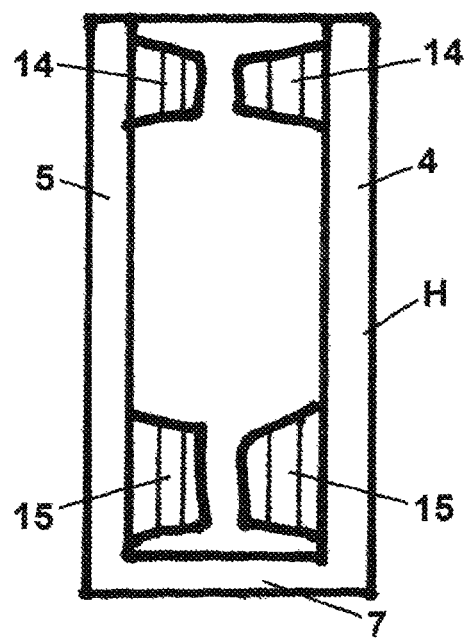
FIG. 11 is a front view of the holder.
Figure 12:
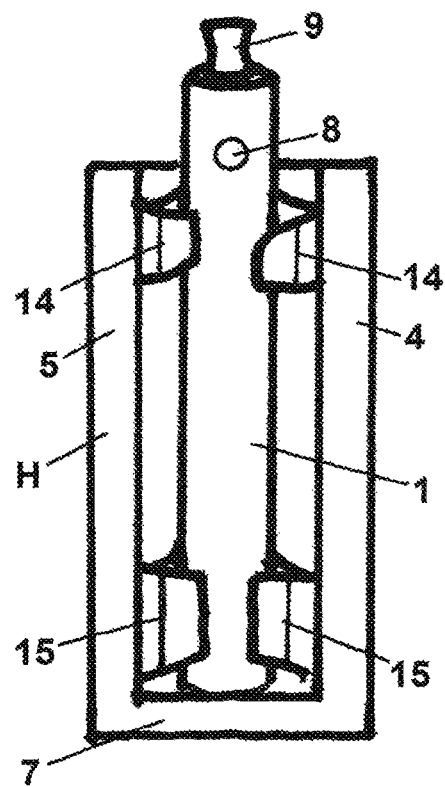
FIG. 12 is a front view of the holder containing a cylindrical Electronic Cigarette.

FIG. 11 shows the empty holder H and its frame comprised of a left side panel 5, a right side panel 4, and a bottom panel 7. Also depicted are the upper flexible constructs 14 and the lower flexible constructs 15. FIG. 9 shows the holder H from the top and the upper flexible constructs 14 and their general configuration. FIG. 3 depicts the pre insertion positions of the holder H, its left side panel 5, and a small diameter Electronic Cigarette 1 with an arrow indicating direction of insertion. FIG. 4 shows the post insertion position of a small diameter Electronic Cigarette within the holder H. This particular depiction shows a small diameter Electronic Cigarette 1 long enough to rest at the bottom of the holder H and have its mouthpiece 9 extend above the top of the holder H. Also shown is the activation button 8 positioned toward the left panel 5 of the holder H. It is up to the discretion of the user where to position the activation button 8 upon insertion as the small diameter Electronic Cigarette 1 can be rotated 360 degrees anywhere along its longitudinal axis prior to insertion. FIG. 4 also shows the anticipated securing depth of a small diameter Electronic Cigarette 1 within the holder H. Note the semi-circular side cut-outs 19 allow for easy insertion and removal into and out of the holder H. FIG. 12 is a front view of a small diameter Electronic Cigarette inserted into the holder H. Shown is the left side panel 5, the right side panel 4, and the bottom panel 7, with the upper 14 and lower 15 flexible constructs engaged by the small diameter Electronic Cigarette 1. The activation button 8 is oriented toward the front opening and the mouthpiece 9 extends above the top of the holder H. FIG. 10 is a top view of a small cylindrical Electronic Cigarette 1 inserted into the holder H and engaged by the upper flexible constructs 14. Illustrated is the resulting displacement and deflection of the upper flexible constructs 14 that constitute the securing means for the Electronic Cigarette. FIG. 7 shows the holder H and a large diameter cylindrical Electronic Cigarette 2 and their orientation to each other prior to insertion with an arrow indicating direction of insertion. FIG. 8 shows the large diameter cylindrical Electronic Cigarette 2 post-insertion. Note the depth of insertion into the holder H of the large diameter cylindrical Electronic Cigarette 2 versus the depth of insertion into the holder H of the small diameter cylindrical Electronic Cigarette 1 as shown in FIG. 4. The depth of insertion necessary to adequately secure a cylindrical Electronic Cigarette within the holder H is a function of its diameter. The smaller the diameter of the cylindrical Electronic Cigarette, the deeper it will be required to be pushed into the holder H to be adequately secured.

Figures 1, 2:
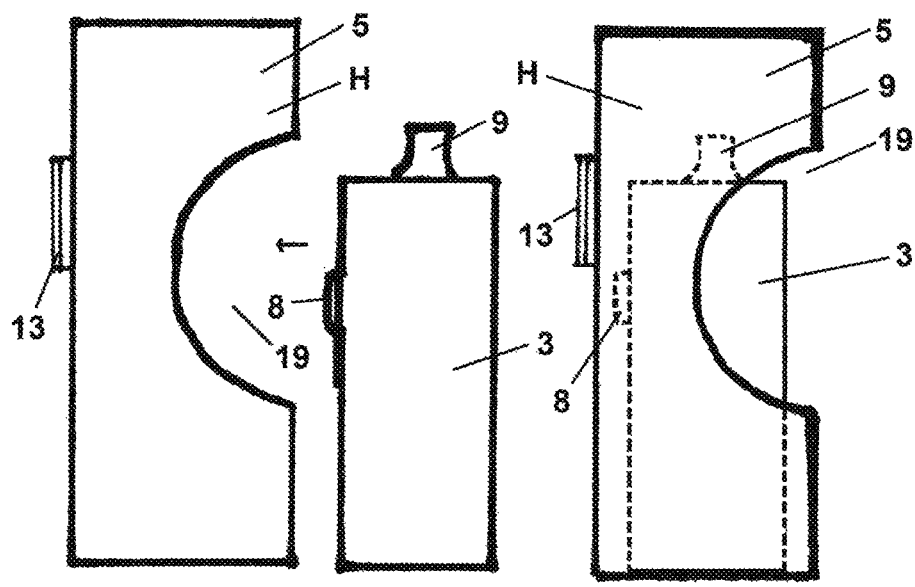
FIG. 1 is a left side view of the holder and a small box-type Electronic Cigarette and their positions relative to each other prior to insertion.
FIG. 2 is a left side view of the holder with a small box-type Electronic Cigarette within the holder with phantom lines indicating the position of the Electronic Cigarette within the holder.
Figure 13:
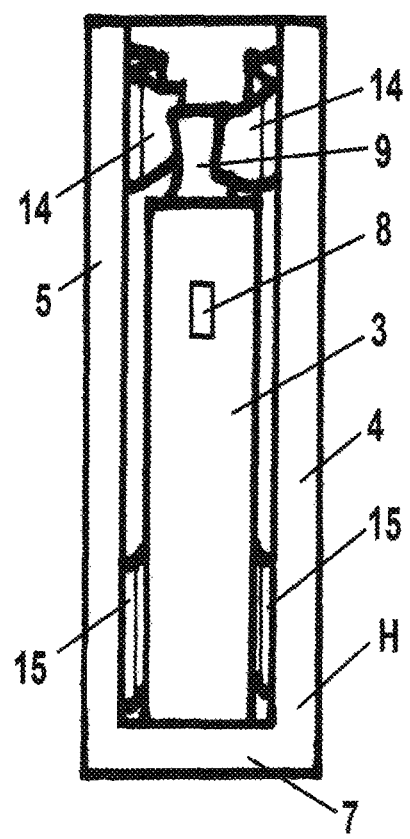
FIG. 13 is a front view of the holder containing a box-type Electronic Cigarette.
Figure 14:
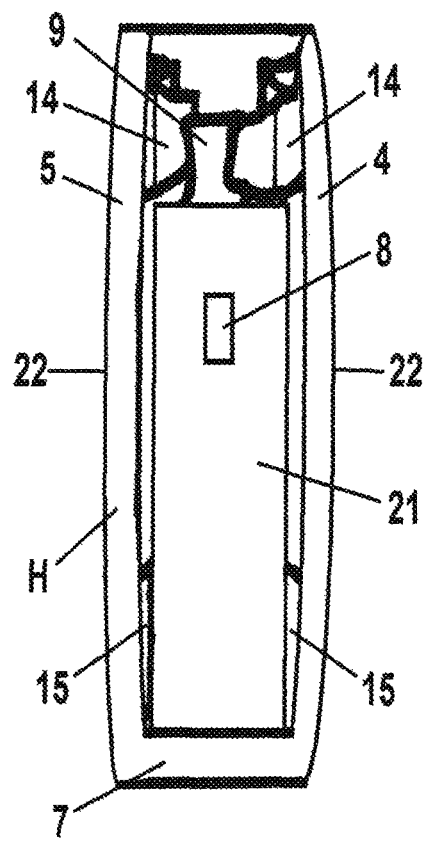
FIG. 14 is a front view of the holder containing a large Electronic Cigarette and depicting the described deflection of the flexible side panels.

FIG. 1 shows the holder H and a small box-type Electronic Cigarette 3 and their orientation to each other prior to insertion with an arrow indicating direction of insertion and the activation button 8 positioned on the leading edge of the Electronic Cigarette relative to insertion. FIG. 2 shows the small box-type Electronic Cigarette 3 post-insertion. Note the insertion depth of this type of Electronic Cigarette and the semi-circular side cut-outs 19 allowing for ease of insertion and removal of box-type Electronic Cigarettes. FIG. 2 displays how this shorter version of a box-type Electronic Cigarette could be secured solely by the lower flexible constructs 18 as it is not tall enough to reach the upper flexible constructs 14. FIG. 5 shows the holder H and a large box-type Electronic Cigarette 21 and their orientation to each other prior to insertion with an arrow indicating the direction of insertion. FIG. 6 shows the large box-type Electronic Cigarette 21 post-insertion. Note that the depth of insertion necessary to adequately secure different size box-type Electronic Cigarettes is depicted by the phantom lines representing the large box-type Electronic Cigarette 21 in FIG. 6, and the small box-type Electronic Cigarette 3 in FIG. 2. FIG. 13 shows a small box-type Electronic Cigarette 3 inserted into the holder H from the front and engaging the upper 14 and lower 15 flexible constructs and the activation button 8 oriented outwardly. FIG. 14 shows a large box-type Electronic Cigarette 21 inserted into the holder H engaging the upper 14 and lower 15 flexible constructs while simultaneously causing the right 4 and left 5 side panels to deflect outwardly resulting in the deflected side panels 22 acting in concert with the interior flexible constructs to secure the Electronic Cigarette. Again, the depth necessary to insert a box-type Electronic Cigarette to be adequately secured within the holder H becomes a function of the dimensions of the box-type Electronic Cigarette.

Figure 15:
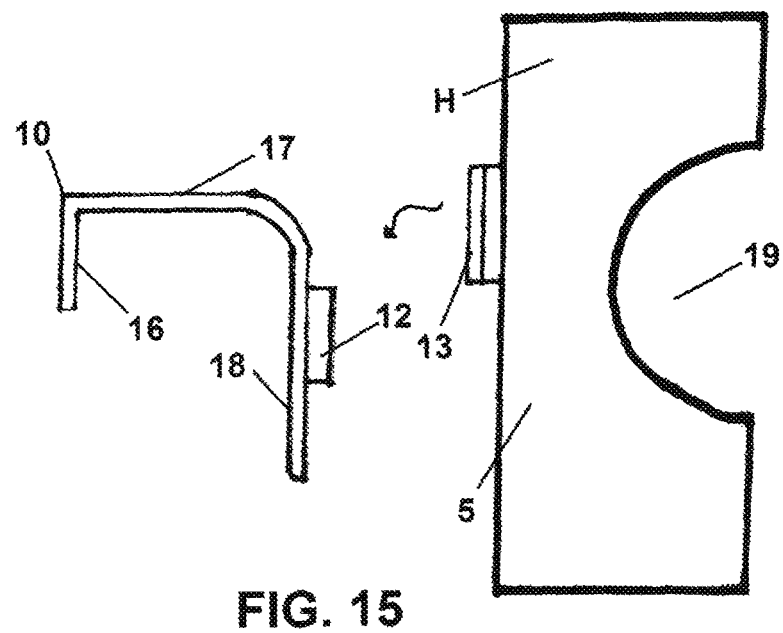
FIG. 15 is a left side view of the holder and a small door panel bracket and their positions relative to each other prior to their coupling.
Figure 16:
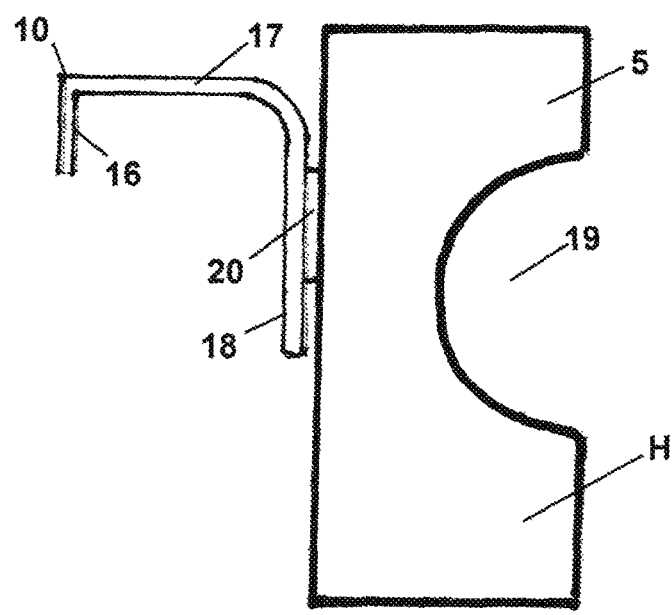
FIG. 16 is a left side view of a holder coupled to a small door panel bracket.
Figure 17:
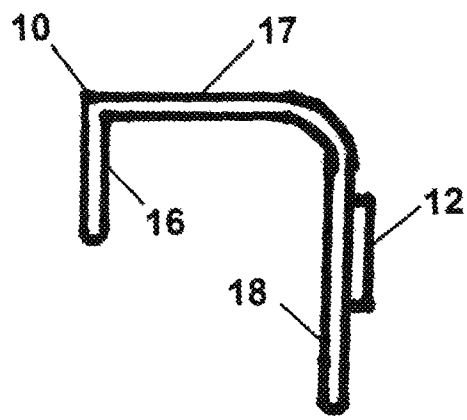
FIG. 17 is a left side view of a small door panel bracket.
Figure 18:
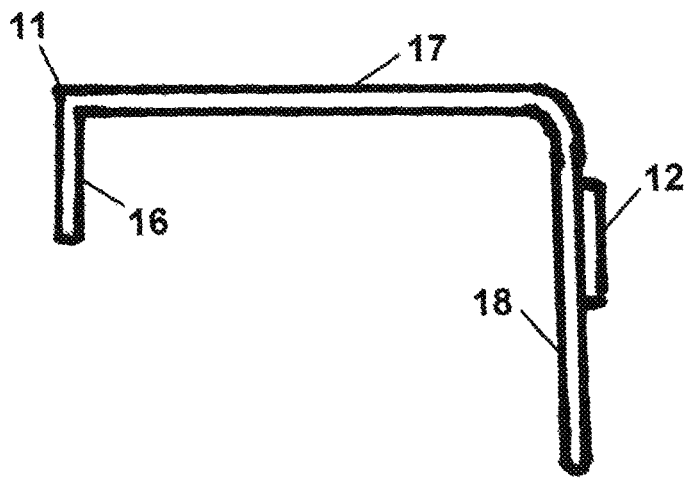
FIG. 18 is a left side view of a wide door panel bracket.
Figure 19:
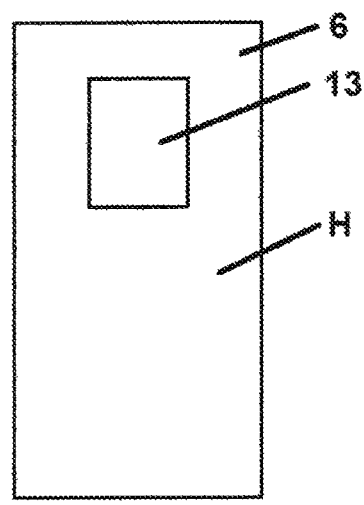
FIG. 19 is a rear view of the holder showing the position of the coupling means.
Figures 20, 21:
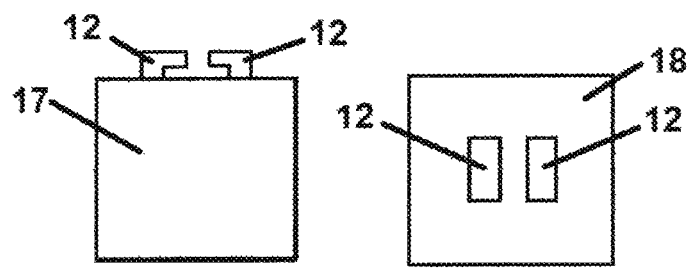
FIG. 20 is a top view of a small vehicle door bracket and its coupling means.
FIG. 21 is a front view of a small vehicle door bracket and its coupling means.
Figure 22:
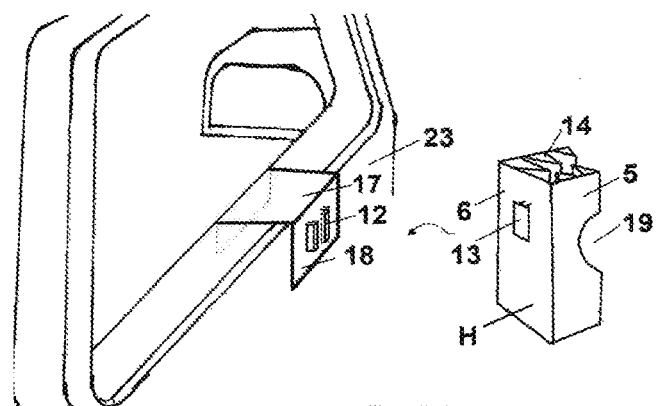
FIG. 22 is an exploded perspective illustration of the Electronic Cigarette holder and a door panel bracket separated with an arrow indicating coupling of the device and the bracket and including the interior vehicle door panel to which they are mounted.

FIG. 17 is a small door panel bracket 10 including its first vertical member 16 designed to extend downward into the channel between the vehicle window glass and its molding, its horizontal member 17 attached to the top of first vertical member 16 and extending inward the vehicle, and connecting to the top of the second vertical member 18 that extends downward along the face of the interior door panel 23. Attached to the outside of the second vertical member is the door panel bracket coupling means 12. FIG. 18 is a wide door panel bracket 11 with the elongated horizontal member 17 being the only difference between it and the small door panel bracket 10 shown in FIG. 17. This illustrates the door panel mounting system designed to accommodate vehicle door panels of varying depths. FIG. 15 shows a small door panel bracket 10 and its coupling means 12, the holder H and its coupling means 13 and their orientation relative to each other prior to coupling and an arrow showing direction of coupling. FIG. 16 shows a small door panel bracket 10, the holder H, and their positions relative to each other post-coupling. Also depicted is the narrow spatial confines between the small door panel bracket 10 and the holder H represented by the coupled means 20. FIG. 19 is the rear panel 6 of the holder H and the position of the holder coupling means 13. FIG. 20 is a top view of the horizontal member 17 of a vehicle door bracket and its coupling means 12. FIG. 21 shows the front of the second vertical member 18 of a vehicle door bracket and its coupling means 12. The vehicle door bracket coupling means 12 acts as a receiver for the holder coupling means 13 shown in FIG. 9 and FIG. 10. FIG. 22 shows a vehicle door panel bracket and its coupling means 12, the horizontal member 17 of the bracket, the second vertical member 18 of the bracket and its mounted position on the vehicle door panel 23. Also shown is the holder H and its position prior to coupling and an arrow showing the direction of coupling. FIG 23 is a depiction of the holder H coupled to the door panel bracket and door panel bracket mounted on the vehicle door pane 23.

What is claimed is:

1. A holder for Electronic Cigarettes for use in a motor vehicle comprising:

A structure formed by a pair of flexible spaced, parallel, side panels each comprising a centrally positioned semi-circular cutout on the front edge thereof, a vertical rear panel coupled to said side panels along their rear edges at or near right angles, a horizontal base panel coupled to each of said side panels at their bottom edge and coupled to said rear panel at its bottom edge to form a semi-enclosure with an open interior allowing device accessibility from the front and the top;

Said holder further comprising an upper securing section and a lower securing section within the interior of said structure, each securing section comprising a plurality of spaced flexile securing means which graduate in length from said front of the structure to said rear of the structure, said spaced flexile securing means extending inward from each of said side panels thereby securely engaging cylindrical or multi-sided devices upon insertion into the holder.

2. The holder of claim 1 wherein said flexible side panels are displaced and deflected outward upon insertion of said cylindrical or multi-sided device.

3. The holder of claim 1 wherein the flexile securing means are manufactured of a thermoplastic elastomer.

4. The holder of claim 1 wherein the structure and the flexile securing means are manufactured of the same thermoplastic elastomer.

5. The holder of claim 1 further comprising a mounting system.

6. The holder of claim 1 further comprising a coupling means for coupling the holder to a bracket.

* * * * *